United States Patent
Amanullah

(10) Patent No.: US 10,883,033 B2
(45) Date of Patent: *Jan. 5, 2021

(54) DATE PALM SEED-BASED LOST CIRCULATION MATERIAL (LCM)

(71) Applicant: Saudi Arabian Oil Company, Dhahran (SA)

(72) Inventor: Md Amanullah, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

This patent is subject to a terminal disclaimer.

(21) Appl. No.: 16/415,495

(22) Filed: May 17, 2019

(65) Prior Publication Data

US 2019/0270924 A1 Sep. 5, 2019

Related U.S. Application Data

(62) Division of application No. 15/250,301, filed on Aug. 29, 2016, now Pat. No. 10,457,846.

(Continued)

(51) Int. Cl.
| | | |
|---|---|---|
| *C09K 8/035* | (2006.01) | |
| *C09K 8/514* | (2006.01) | |
| *C09K 8/516* | (2006.01) | |

(52) U.S. Cl.
CPC .......... *C09K 8/035* (2013.01); *C09K 8/514* (2013.01); *C09K 8/516* (2013.01); *C09K 2208/04* (2013.01)

(58) Field of Classification Search
None
See application file for complete search history.

(56) References Cited

U.S. PATENT DOCUMENTS

| | | |
|---|---|---|
| 2,483,936 A | 10/1949 | Roberts |
| 2,600,404 A | 6/1952 | Hoeppel |

(Continued)

FOREIGN PATENT DOCUMENTS

| | | |
|---|---|---|
| CN | 101311243 A | 11/2008 |
| CN | 101560084 A | 10/2009 |

(Continued)

OTHER PUBLICATIONS

"Wood Shop News, Issue #08 Hard and softwoods, a unique food bank, and more news from around the shop" available as of Oct. 8, 2018 at the website: https://www.wooden-box-maker.com/Wood_Shop_News-hardwoods-and-softwoods.html.

(Continued)

*Primary Examiner* — John J Figueroa
(74) *Attorney, Agent, or Firm* — Bracewell LLP; Constance G. Rhebergen; Brian H. Tompkins

(57) ABSTRACT

A date palm seed-based lost circulation material (LCM) is provided. A date palm seed LCM may be manufactured by drying date palm seeds and grinding the dried date palm seeds to create a plurality of particles. The particles may have sizes less than 4 mm, from 1 mm to 2 mm, or from 2 mm to 4 mm. The date palm seed LCM may have a volumetric swelling greater than an LCM formed from tree nuts and may have a volumetric swelling of at least 0.3 cubic centimeters per gram. The date palm seed LCM may have a D50 shift factor less than an LCM formed from calcium carbonate and may have a D50 shift factor of at least 0.38%. The date palm seed LCM may have a stability index of at least 0.95. Methods of lost circulation control and manufacture of a date palm seed LCM are also provided.

23 Claims, 6 Drawing Sheets

Related U.S. Application Data

(60) Provisional application No. 62/256,540, filed on Nov. 17, 2015.

(56) References Cited

U.S. PATENT DOCUMENTS

| | | |
|---|---|---|
| 2,749,308 A | 6/1956 | Beckum et al. |
| 2,779,417 A | 1/1957 | Clark, Jr. et al. |
| 2,789,948 A | 4/1957 | Tronolone |
| 2,811,488 A | 10/1957 | Nestle et al. |
| 2,912,380 A | 11/1959 | Groves |
| 2,943,679 A | 7/1960 | Scott, Jr. |
| 2,943,680 A | 7/1960 | Scott et al. |
| 3,147,127 A | 9/1964 | Shannon |
| 3,217,801 A | 11/1965 | Fast et al. |
| 4,086,098 A | 4/1978 | Le Ruyet et al. |
| 4,110,225 A | 8/1978 | Cagle |
| 4,127,548 A | 11/1978 | Alexander |
| 4,247,403 A | 1/1981 | Foley et al. |
| 4,275,788 A | 6/1981 | Sweatman |
| 4,428,844 A | 1/1984 | Wagener |
| 4,474,665 A | 10/1984 | Green |
| 4,579,668 A | 4/1986 | Messenger |
| 4,619,772 A | 10/1986 | Black et al. |
| 5,004,553 A | 4/1991 | House et al. |
| 5,118,664 A | 6/1992 | Burts, Jr. |
| 5,197,324 A | 3/1993 | Keys |
| 5,332,724 A | 7/1994 | Burts, Jr. |
| 5,484,028 A | 1/1996 | Rose |
| 5,501,275 A | 3/1996 | Card et al. |
| 5,801,127 A | 9/1998 | Duhon, Sr. |
| 6,016,879 A * | 1/2000 | Burts, Jr. .............. C09K 8/035 166/295 |
| 6,098,712 A | 8/2000 | Burts, Jr. |
| 6,102,121 A | 8/2000 | Burts, Jr. |
| 6,271,001 B1 | 8/2001 | Clarke et al. |
| 6,350,594 B1 | 2/2002 | Clarke et al. |
| 6,518,224 B2 | 2/2003 | Wood |
| 6,716,798 B1 | 4/2004 | Burts, Jr. |
| 6,750,179 B1 | 6/2004 | Burts, Jr. |
| 6,790,812 B2 | 9/2004 | Halliday |
| 6,806,232 B1 | 10/2004 | Cart |
| 6,814,798 B2 | 11/2004 | Vijn et al. |
| 6,861,392 B2 | 3/2005 | Shaarpour |
| 6,932,158 B2 | 8/2005 | Burts |
| 7,226,895 B2 | 6/2007 | Xiang |
| 7,271,131 B2 | 9/2007 | Halliday et al. |
| 7,284,611 B2 | 10/2007 | Reddy et al. |
| 7,297,662 B2 | 11/2007 | Verret |
| 7,297,663 B1 | 11/2007 | Kilchrist et al. |
| 7,332,026 B2 | 2/2008 | Fyten et al. |
| 7,488,705 B2 | 2/2009 | Reddy et al. |
| 7,507,692 B2 | 3/2009 | Xiang |
| 7,537,054 B2 | 5/2009 | Reddy et al. |
| 7,541,317 B2 | 6/2009 | Pomerleau |
| 7,629,297 B2 | 12/2009 | Shaarpour |
| 7,744,689 B2 | 6/2010 | Hojaji et al. |
| 7,795,184 B2 | 9/2010 | Pomerleau |
| 7,902,126 B1 | 3/2011 | Burts, Jr. |
| 7,923,413 B2 | 4/2011 | Ghassemzadeh |
| 7,964,537 B2 | 6/2011 | Rayborn, Sr. et al. |
| 8,371,381 B2 | 2/2013 | Shindgikar et al. |
| 8,383,558 B2 | 2/2013 | Reddy et al. |
| 8,404,622 B2 | 3/2013 | Ghassemzadeh |
| 8,673,825 B2 | 3/2014 | Rayborn, Sr. et al. |
| 8,739,872 B1 | 6/2014 | Miller et al. |
| 8,776,882 B2 | 7/2014 | Shindgikar et al. |
| 8,887,808 B2 | 11/2014 | Kumar et al. |
| 8,935,957 B2 | 1/2015 | Kulkarni et al. |
| 8,992,670 B1 | 3/2015 | Vohra |
| 9,140,118 B2 | 9/2015 | Kulkarni et al. |
| 9,175,529 B2 | 11/2015 | Jamison et al. |
| 9,290,687 B1 | 3/2016 | Weaver |
| 9,376,607 B2 | 6/2016 | James |
| 9,410,066 B2 | 8/2016 | Ghassemzadeh |
| 9,416,306 B2 | 8/2016 | Savari et al. |
| 9,453,156 B2 | 9/2016 | Wu |
| 9,505,659 B2 | 11/2016 | Bickbau |
| 9,592,488 B2 | 3/2017 | Yusuf et al. |
| 9,623,067 B1 | 4/2017 | Awad et al. |
| 9,688,901 B2 | 6/2017 | Fontenot |
| 9,783,727 B2 | 10/2017 | Lahman et al. |
| 9,957,433 B2 | 5/2018 | Amanullah et al. |
| 10,513,647 B2 | 12/2019 | Amanullah |
| 10,519,357 B2 | 12/2019 | Amanullah |
| 2002/0010100 A1 | 1/2002 | Wood |
| 2004/0023813 A1 | 2/2004 | Burts, III |
| 2004/0129460 A1 | 7/2004 | MacQuoid et al. |
| 2004/0244978 A1 | 12/2004 | Shaarpour |
| 2005/0113260 A1 | 5/2005 | Wood |
| 2005/0124502 A1 | 6/2005 | Shaarpour |
| 2005/0217852 A1 | 10/2005 | Bennett et al. |
| 2006/0106136 A1 | 5/2006 | Abu-Sharkh |
| 2006/0122069 A1 | 6/2006 | Burts, III |
| 2006/0157247 A1 | 7/2006 | Burts, III |
| 2006/0160907 A1 * | 7/2006 | Stamp .............. C05F 5/002 516/100 |
| 2009/0054269 A1 | 2/2009 | Chatterji et al. |
| 2009/0286697 A1 | 11/2009 | Shaarpour |
| 2009/0305038 A1 | 12/2009 | Duran et al. |
| 2009/0305911 A1 | 12/2009 | Pomerleau |
| 2010/0152070 A1 | 6/2010 | Ghassemzadeh |
| 2010/0181110 A1 | 7/2010 | Harr |
| 2010/0193244 A1 | 8/2010 | Hoskins |
| 2010/0230164 A1 | 9/2010 | Pomerleau |
| 2010/0230169 A1 | 9/2010 | Pomerleau |
| 2011/0214870 A1 | 9/2011 | Shaarpour |
| 2011/0278006 A1 | 11/2011 | Sanders |
| 2012/0157354 A1 | 6/2012 | Li et al. |
| 2012/0247763 A1 | 10/2012 | Rakitsky et al. |
| 2013/0025863 A1 | 1/2013 | Lin et al. |
| 2014/0038857 A1 | 2/2014 | Miller et al. |
| 2014/0102987 A1 | 4/2014 | Yusuf et al. |
| 2014/0110177 A1 | 4/2014 | Harr |
| 2014/0135237 A1 | 5/2014 | Villarreal, Jr. et al. |
| 2014/0209290 A1 | 7/2014 | Jamison et al. |
| 2014/0231082 A1 | 8/2014 | Jamison et al. |
| 2014/0262281 A1 | 9/2014 | Kulkarni et al. |
| 2014/0318793 A1 | 10/2014 | Van Petergem et al. |
| 2014/0353043 A1 | 12/2014 | Amanullah et al. |
| 2015/0008044 A1 | 1/2015 | Fontenot |
| 2015/0051120 A1 | 2/2015 | Hurd et al. |
| 2015/0072901 A1 | 3/2015 | Samuel et al. |
| 2015/0166875 A1 | 6/2015 | Bird et al. |
| 2015/0247081 A1 | 9/2015 | Dillon et al. |
| 2015/0251156 A1 | 9/2015 | Yusuf et al. |
| 2016/0060985 A1 | 3/2016 | Lin et al. |
| 2016/0096988 A1 | 4/2016 | Lin et al. |
| 2016/0137903 A1 | 5/2016 | Friedheim et al. |
| 2016/0177164 A1 | 6/2016 | Dillon et al. |
| 2016/0222274 A1 | 8/2016 | Hoskins |
| 2016/0222275 A1 | 8/2016 | Galindo et al. |
| 2016/0257869 A1 | 9/2016 | Kulkarni et al. |
| 2016/0264839 A1 | 9/2016 | Mata et al. |
| 2016/0289528 A1 | 10/2016 | Wagle et al. |
| 2016/0312100 A1 | 10/2016 | Amanullah et al. |
| 2017/0058180 A1 | 3/2017 | Hossain et al. |
| 2017/0137688 A1 | 5/2017 | Amanullah |
| 2017/0166795 A1 | 6/2017 | Walker et al. |
| 2017/0240791 A1 | 8/2017 | Oliveira et al. |
| 2017/0298263 A1 | 10/2017 | Amanullah |
| 2018/0002588 A1 | 1/2018 | Amanullah |
| 2018/0002589 A1 | 1/2018 | Amanullah |
| 2018/0016483 A1 | 1/2018 | Amanullah |
| 2018/0057729 A1 | 3/2018 | Amanullah |
| 2018/0201819 A1 | 7/2018 | Amanullah |
| 2019/0177593 A1 | 6/2019 | Amanullah |
| 2019/0177594 A1 | 6/2019 | Amanullah |
| 2019/0177595 A1 | 6/2019 | Amanullah |
| 2019/0233705 A1 | 8/2019 | Amanullah et al. |
| 2020/0002592 A1 | 1/2020 | Amanullah |
| 2020/0079987 A1 | 3/2020 | Amanullah |
| 2020/0079988 A1 | 3/2020 | Amanullah |

(56) References Cited

U.S. PATENT DOCUMENTS

FOREIGN PATENT DOCUMENTS

| | | | |
|---|---|---|---|
| CN | 101724383 A | 6/2010 |
| CN | 102127403 A | 7/2011 |
| CN | 203035080 U | 7/2013 |
| CN | 103570298 A | 2/2014 |
| CN | 103740346 A | 4/2014 |
| CN | 104087274 A | 10/2014 |
| CN | 104419392 A | 3/2015 |
| CN | 105541159 A | 5/2016 |
| GB | 2506603 A | 4/2014 |
| GB | 2518441 A | 3/2015 |
| JP | 0671171 A | 3/1994 |
| WO | 200153429 A1 | 7/2001 |
| WO | 2004013448 A2 | 2/2004 |
| WO | 2010019535 A2 | 2/2010 |
| WO | 2010088484 A2 | 8/2010 |
| WO | 2010142370 A1 | 12/2010 |
| WO | 2012037600 A1 | 3/2012 |
| WO | 2012061187 A2 | 5/2012 |
| WO | 2013039938 A1 | 3/2013 |
| WO | 2014008598 A1 | 1/2014 |
| WO | 2014197417 A1 | 12/2014 |
| WO | 2015142156 A1 | 9/2015 |
| WO | 2015199652 A1 | 12/2015 |
| WO | 2016019416 A1 | 2/2016 |
| WO | 2016028470 A1 | 2/2016 |
| WO | 2016172287 A1 | 10/2016 |
| WO | 2017087434 A1 | 5/2017 |
| WO | 2018005575 A1 | 1/2018 |
| WO | 2018013619 A1 | 1/2018 |

OTHER PUBLICATIONS

Alawad, Musaed N.J., et al.; "Superior fracture-seal material using crushed date palm seeds for oil and gas well drilling operations" Journal of King Saud University—Engineering Sciences (2017); pp. 1-7.

Al-Awad, Musaed NJ et al.; "Utilization of Shredded Waste Car Tyres as a Fracture Seal Material (FSM) in Oil and Gas Drilling Operations" Journal of Petroleum & Environmental Biotechnology, (2017) vol. 8, Issue 2; pp. 1-4.

Alsaba, M. et al.; "Review of lost circulation materials and treatments with an updated classification." AADE National Technical Conference and Exhibition, Houston, TX, Apr. 2014; pp. 1-9.

Amanullah, et al.; "Application of an indigenous eco-friendly raw material as fluid loss additive", Journal of Petroleum Science and Engineering, vol. 139, (2016); pp. 191-197.

Amanullah; "Characteristics, behavior and performance of ARC Plug-A date seed-based sized particulate LCM." SPE Kingdom of Saudi Arabia Annual Technical Symposium and Exhibition. Society of Petroleum Engineers, 2016; pp. 1-9.

BakerHughes.com "SOLUFLAKE Flaked Calcium Carbonate" (XP055401101) Jan. 8, 2016; p. 1.

International Search Report and Written Opinion for International Application No. PCT/US2016/062130 (SA5410/PCT); Report dated Jan. 27, 2017; pp. 1-12.

International Search Report and Written Opinion for International Application No. PCT/US2017/027287 (SA5508/PCT); report dated Sep. 13, 2017; 11 pages.

International Search Report and Written Opinion for International Application No. PCT/US2017/039614 (SA5532/PCT); Report dated Sep. 11, 2017; pp. 1-12.

International Search Report and Written Opinion for International Application No. PCT/US2017/039616 (SA5533/PCT); Report dated Sep. 11, 2017; pp. 1-11.

International Search Report and Written Opinion for International Application No. PCT/US2017/047877 (SA5599/PCT); Report dated Oct. 27, 2017; pp. 1-15.

International Search Report and Written Opinion for International Application No. PCT/US2017/053355 (SA5580/PCT); International filing date Sep. 26, 2017; Report dated Jan. 17, 2018; pp. 1-14.

International Search Report and Written Opinion for International Application No. PCT/US2017/060079 (SA5577/PCT); International Filing Date Nov. 6, 2017; Report dated Dec. 18, 2017; pp. 1-14.

International Search Report and Written Opinion for International Application No. PCT/US2017/067179 (SA5600/PCT) International Filing Date Dec. 19, 2017; Report dated Feb. 21, 2018; pp. 1-14.

International Search Report and Written Opinion for International Application No. PCT/US2017/041611 (SA5534); International Filing Date Jul. 12, 2017; Report dated Oct. 27, 2017 (pp. 1-15).

International Search Report and Written Opinion for International Application No. PCT/US2018/034291 (SA5652/PCT); International Filing Date May 24, 2018; Report dated Jul. 31, 2018 (pp. 1-11).

International Search Report and Written Opinion for International Application No. PCT/US2018/048423 (SA5757); International Filing Date Aug. 29, 2018; Report dated Nov. 29, 2018 (pp. 1-12).

Saudi Aramco "Local palm trees support technical solutions" Dhahran, Aug. 4, 2015; available as of Sep. 19, 2018 at the website: www.saudiaramco.com/en/home/news-media/news/local-palm-trees-support.html.

Wajheeuddin, M. et al.; "An Experimental Study on Particle Sizing of Natural Substitutes for Drilling Fluid Applications." Journal of Nature Science and Sustainable Technology vol. 8, No. 2 (2014); pp. 1-14.

International Search Report and Written Opinion for International Application No. PCT/US2019/016614 (SA5796) report dated Jun. 3, 2019; pp. 1-12.

International Search Report and Written Opinion for International Application No. PCT/US2019/022843 (SA5854) report dated Jun. 3, 2019; pp. 1-13.

Wajheeuddin, Mohammed; "Development of an Environmentally-Friendly Drilling Fluid Using Date Seeds and Grass" Master's thesis, King Fahd University of Petroleum & Minerals, 2014; pp. 1-138.

\* cited by examiner

DATE PALM SEED-BASED LOST CIRCULATION MATERIAL (LCM)

CROSS-REFERENCE TO RELATED PATENT APPLICATIONS

This application is a divisional of and claims priority from U.S. Non-provisional application Ser. No. 15/250,301, filed Aug. 29, 2016, and titled "DATE PALM SEED-BASED LOST CIRCULATION MATERIAL (LCM)," which claims priority from U.S. Provisional Application No. 62/256,540, filed Nov. 17, 2015, and titled "DATE PALM SEED-BASED LOST CIRCULATION MATERIAL (LCM)," each of which are incorporated by reference in their entirety for purposes of United States patent practice.

BACKGROUND

Field of the Disclosure

The present disclosure generally relate to controlling lost circulation in a wellbore during drilling with a drilling fluid. More specifically, embodiments of the disclosure relate to an organic, particulate lost circulation material.

Description of the Related Art

Lost circulation is one of the frequent challenges encountered during drilling operations. Lost circulation, which can be encountered during any stage of operations, occurs when drilling fluid (or drilling mud) pumped into a well returns partially or does not return to the surface. While some fluid loss is expected, fluid loss beyond acceptable norms is not desirable from a technical, an economical, or an environmental point of view. About 75% of the wells drilled per year encounter lost circulation problems to some extent. Lost circulation is associated with problems with well control, borehole instability, pipe sticking, unsuccessful production tests, poor hydrocarbon production after well completion, and formation damage due to plugging of pores and pore throats by mud particles. In extreme cases, lost circulation problems may force abandonment of a well. In addition, delays in controlling lost circulation can lead to highly complex problems, including the failure to control the lost circulation in any meaningful way.

Lost circulation can be categorized as seepage type, moderate type, severe type, and total loss, referring to the amount of fluid or mud lost. The extent of the fluid loss and the ability to control the lost circulation with an LCM depends on the type of formation in which the lost circulation occurs. Formations with low permeability zones, that is, those with microscopic cracks and fissures, usually have seepage type lost circulation. Other formations may experience lost circulation if an improper mud weight is used while drilling. Such formations include narrow mud weight window, low fracture gradient, depleted reservoir pressure, formations with soluble minerals such as halite, evaporate, and anhydrite.

SUMMARY

Lost circulation materials (LCMs) are used to mitigate the lost circulation by blocking the path of the drilling mud into the formation. The type of LCM used in a loss circulation situation depends on the extent of lost circulation and the type of formation. Lost dollars are due to losses of drilling fluids, losses of production, and the costs of LCMs, including importation of LCMs to drilling locations, used in combating lost circulation. Additionally, lost circulation can cause environmental problems if drilling fluids or LCMs interact with the environment surrounding the reservoir. The manufacture, use, and disposal of some conventional LCMs may pose a risk to sensitive environments, such as marine environments because they are not biodegradable and can be toxic to marine life. Additionally, the purchase and importation of LCMs to drilling locations may be expensive and time-consuming.

Embodiments of the disclosure generally relate to a date palm seed lost circulation material (LCM) that includes date palm seed particles and methods to control lost circulation in a lost circulation zone in a wellbore with the date palm seed LCM. More specifically, embodiments of the disclosure relate to a date palm seed LCM that includes a plurality of untreated particles of ground date palm seeds.

In some embodiments, a method to control lost circulation in a lost circulation zone in a wellbore is provided. The method includes introducing an altered drilling fluid into the well bore such that the altered drilling fluid contacts the lost circulation zone and reduces a rate of lost circulation into the lost circulation zone. The altered drilling fluid includes a drilling fluid and a lost circulation material (LCM), and LCM includes a plurality of untreated particles including ground date palm seeds.

In some embodiments, the method includes adding the lost circulation material to the drilling fluid to create the altered drilling fluid. In some embodiments, the untreated particles consist of ground date palm seeds. In some embodiments, the LCM consists of a plurality of untreated particles consisting essentially of ground date palm seeds. In some embodiments, the altered drilling fluid consists of the drilling fluid and the LCM, where the LCM consists essentially of a plurality of untreated particles consisting essentially of ground date palm seeds. In some embodiments, the reduced rate of lost circulation is at least 80% less by volume than before introduction of the altered drilling fluid. In some embodiments, the reduced rate of lost circulation is negligible. In some embodiments, the LCM has a volumetric swelling in fresh water that is greater than a similar LCM formed from tree nuts. In some embodiments, the similar LCM formed from tree nuts is formed from walnuts. In some embodiments, the LCM has a volumetric swelling in fresh water over four hours of at least 0.3 cubic centimeters per gram. In some embodiments, each of the plurality of untreated particles have a particle size in a range of 2 millimeters to 4 millimeters. In some embodiments, the LCM has a D50 shift factor less than a similar LCM formed from calcium carbonate. In some embodiments, the LCM has a D50 shift factor of at least 0.38%. In some embodiments, the LCM has a stability index of at least 0.95.

In another embodiment, a method of forming an alerted drilling fluid is provided. The method includes drying a plurality of date palm seeds and grinding the plurality of date palm seeds to produce the plurality of untreated particles. The method further includes blending the plurality of untreated particles into a lost circulation material (LCM) composition and blending the LCM composition into a drilling fluid to create an altered drilling fluid. In some embodiments, the drilling fluid is water-based drilling fluid. In some embodiments, the LCM composition consists essentially of the plurality of untreated particles. In some embodiments, the plurality of untreated particles are not introduced to an alkali, an acid, a bleaching or an oxidation agent before blending into the LCM composition. In some embodiments, the drying occurs using the sun over a time period in atmospheric conditions. In some embodiments, the plurality of untreated parties are blended into a LCM composition including a carrier fluid and a viscosifier. In some embodiments, the LCM composition is a homogenous suspension. In some embodiment, the LCM composition is a plurality of solid pellets. In some embodiments, the plurality of untreated particles have a particle size selected to block fractures having a size of 4 millimeters in the lost circulation zone.

In another embodiment, an altered drilling fluid is provided. The altered drilling fluid includes a drilling fluid and a lost circulation material (LCM), such that the LCM includes a plurality of untreated particles including ground date palm seeds. In some embodiments, the untreated particles consist of ground date palm seeds. In some embodiments, the LCM consists of a plurality of untreated particles consisting essentially of ground date palm seeds. In some embodiments, the LCM includes a carrier fluid and a viscosifier. In some embodiments, the plurality of untreated particles, the carrier fluid, and the viscosifier form a homogenous suspension. In some embodiments, the plurality of untreated particles, the carrier fluid, and the viscosifier form a plurality of pellets. In some embodiments, each of the plurality of untreated particles as a particle size in the range of 1 millimeters to 2 millimeters.

In another embodiment, lost circulation material (LCM) composition is provided. The LCM composition includes a plurality of untreated particles including ground date palm seeds, a carrier fluid, and a viscosifier. In some embodiments, the plurality of untreated particles consist of ground date palm seeds. In some embodiment, the plurality of untreated particles consist essentially of ground date palm seeds. In some embodiments, the plurality of untreated particles, the carrier fluid, and the viscosifier form a homogenous suspension. In some embodiments, the plurality of untreated particles, the carrier fluid, and the viscosifier form a plurality of pellets. In some embodiments, the LCM composition has a volumetric swelling in fresh water that is greater than a similar LCM formed from tree nuts. In some embodiments, the LCM composition has a volumetric swelling in fresh water over four hours of at least 0.3 cubic centimeters per gram. In some embodiments, each of the plurality of untreated particles has a particle size in the range of 1 millimeters to 2 millimeters.

In another embodiment, a method of forming a lost control material (LCM) composition is provided. The method includes grinding a plurality of date palm seeds to form a plurality of date palm seed particles without treating the plurality of date palm seed particles and mixing the plurality of date palm seed particles with a carrier fluid and viscosifier to form the LCM composition. In some embodiments, the LCM composition includes a homogenous suspension. In some embodiments, grinding the plurality of date palm seeds includes grinding the plurality of date palm seeds without treating the plurality of date palm seed particles with an alkali or an acid, without bleaching and without oxidizing. In some embodiments, the method includes sun-drying the plurality of date palm seeds over a time period in atmospheric conditions before the grinding.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION

Figure 1:
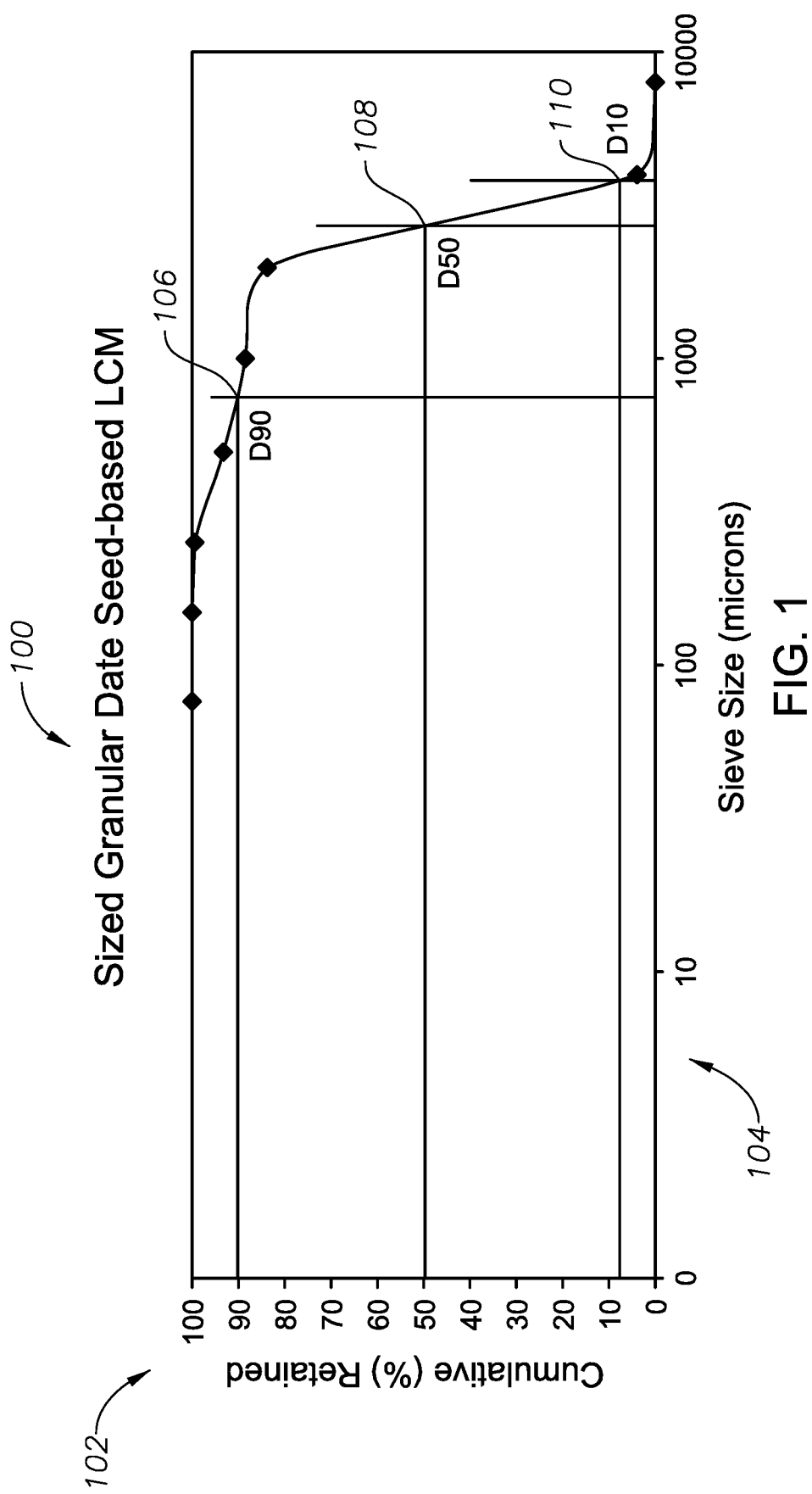
FIG. 1 is a graph of a particle size distribution of date palm seed LCMs manufactured by crushing and grinding date palm seeds using a grinder in accordance with an embodiment of the disclosure.

The present disclosure will now be described more fully with reference to the accompanying drawings, which illustrate embodiments of the disclosure. This disclosure may, however, be embodied in many different forms and should not be construed as limited to the illustrated embodiments set forth in the disclosure. Rather, these embodiments are provided so that this disclosure will be thorough and complete, and will fully convey the scope of the disclosure to those skilled in the art.

As a wellbore is drilled, a drilling fluid is continuously pumped into the wellbore to clear and clean the wellbore and the filings. The drilling fluid is pumped from a mud pit into the wellbore and returns again to the surface. A lost circulation zone is encountered when the flow rate of the drilling fluid that returns to the surface is less than the flow rate of the drilling fluid pumped into the wellbore, and it is this reduction or absence of returning drilling fluid that is referred to as lost circulation.

Embodiments of the disclosure include a date palm seed LCM that includes date palm seeds (also referred to as "date tree seed" or "date palm seed") to mitigate or prevent such lost circulation in a well, as well as provide seepage control and minimize or prevent fluid loss. In some embodiments, the date palm seed LCM may be added directly to a drilling fluid (for example, a drilling mud) as a preventative approach for lost circulation control. In some embodiments, the date palm seed LCM may be mixed with a carrier fluid and a viscosifier to form a homogenous suspension or a pill. In some embodiments, the date palm seed LCM may be combined with another LCM and mixed in a carrier fluid and a viscosifier to form a homogenous suspension or a pill. In some embodiments, the date palm seed LCM may be added as a component of a loss control slurry (LCS). In some embodiments, the date palm seed LCM may be combined with other LCMs to form an LCM blend for different loss control applications. Additionally, the LCM may also be added to a drilling fluid system to increase the fracture gradient due to an increase in load bearing capacity or hoop stress around the wellbore.

In some embodiments, the date palm seed LCM may include untreated date palm seed particles. As used in the disclosure, the term "untreated" or "without treating" refers to not treated with alkali or acid, not bleached, not chemically altered, not oxidized, and without any extraction or reaction process other than possibly drying of water. The term "untreated" or "without treatments" does not encompass grinding or heating to remove moisture but does encompass chemical or other processes that may change the characteristics or properties of the LCM. In accordance with this definition, an LCM that is treated may behave in a manner different than its original starting material. In such embodiments, the date palm seed particles may be manufactured without treating before, during, or after crushing, grinding, drying, or any other processing.

In some embodiments, the date palm seed LCM may include date palm seed particles of approximately the same size or size range. In some embodiments, the date palm seed LCM may be produced by crushing date palm seeds, grinding date palm seeds, or both. The crushed date palm seeds, ground date palm seeds, or both may be sifted using a sieve to produce a date palm seed particulate having a specific size or size range. In some embodiments, the date palm seed particles may be less than about 4 millimeters (mm). In some embodiments, the date palm seed particles may be greater than about 2 mm and less than about 4 mm. In some embodiments, the date palm seed particulate may be greater than about 1 mm and less than about 2 mm.

The date palm seed LCM described in the disclosure is chemically inert, physically granular, mechanically strong, biodegradable, environmentally-friendly and non-toxic. As described infra, the date palm seed LCM may have an attrition resistance greater than conventional calcium carbonate LCM. Additionally, the date palm seed LCM may have better volumetric swelling properties than conventional tree nut based LCMs and thus may have sealing and blocking capacity better than conventional tree nut based LCMs. Thus, in some embodiments, the date palm seed LCM described in the disclosure may to plug the permeable paths and gaps of a loss zone and strengthen a near-wellbore formation to increase the fracture gradient and widen the mud weight window.

FIG. 1 depicts a particle size distribution 100 of date palm seed LCMs manufactured by crushing and grinding date palm seeds using a grinder in accordance with an embodiment of the disclosure. As shown in FIG. 1, the Y-axis 102 corresponds to the cumulative retained percentage of the date palm seed particles and the X-axis 104 corresponds to the sieve sizes (in microns) used in the analysis of the particle sizes.

FIG. 1 also depicts various particle size distributions, including the D90, D50, and D10 particle size distribution values. For example, the D90 value 106 is shown at about 800 microns, the D50 value 108 is shown at about 2750 microns (2.75 mm), and the D10 value 110 is shown at about 6000 microns. For example, Table 1 depicts sieve analysis data for a date palm seed LCM manufactured by grinding date palm seeds.

TABLE 1

| Sieve Analysis Data | |
| --- | --- |
| Sieve Size | Amount (gm) |
| Retained on 8 mm Sieve | 0 |
| Retained on 4 mm Sieve | 46.15 |

TABLE 1-continued

| Sieve Analysis Data | |
| --- | --- |
| Sieve Size | Amount (gm) |
| Retained on 2 mm Sieve | 904.26 |
| Retained on 1 mm Sieve | 55.61 |
| Retained on 500 micron sieve | 52.89 |
| Retained on 250 micron sieve | 69.1 |
| Retained on 150 micron sieve | 9.59 |
| Retained on 75 micron sieve | 0.59 |
| Retained on blank (<75 micron) | 0 |

As will be appreciated, depending on the size range or the D50 value, the date palm seed LCM may seal gaps of different sizes when used to mitigate or prevent lost circulation in a well. In some embodiments, the date palm seed LCM may be generally granular shaped with various size ranges to enable the date palm seed LCM to enter porous and permeable paths, cracks, and fractures in a formation causing mud losses in order to produce an effective seal, barrier, or other preventative to further mud losses.

Figure 2:
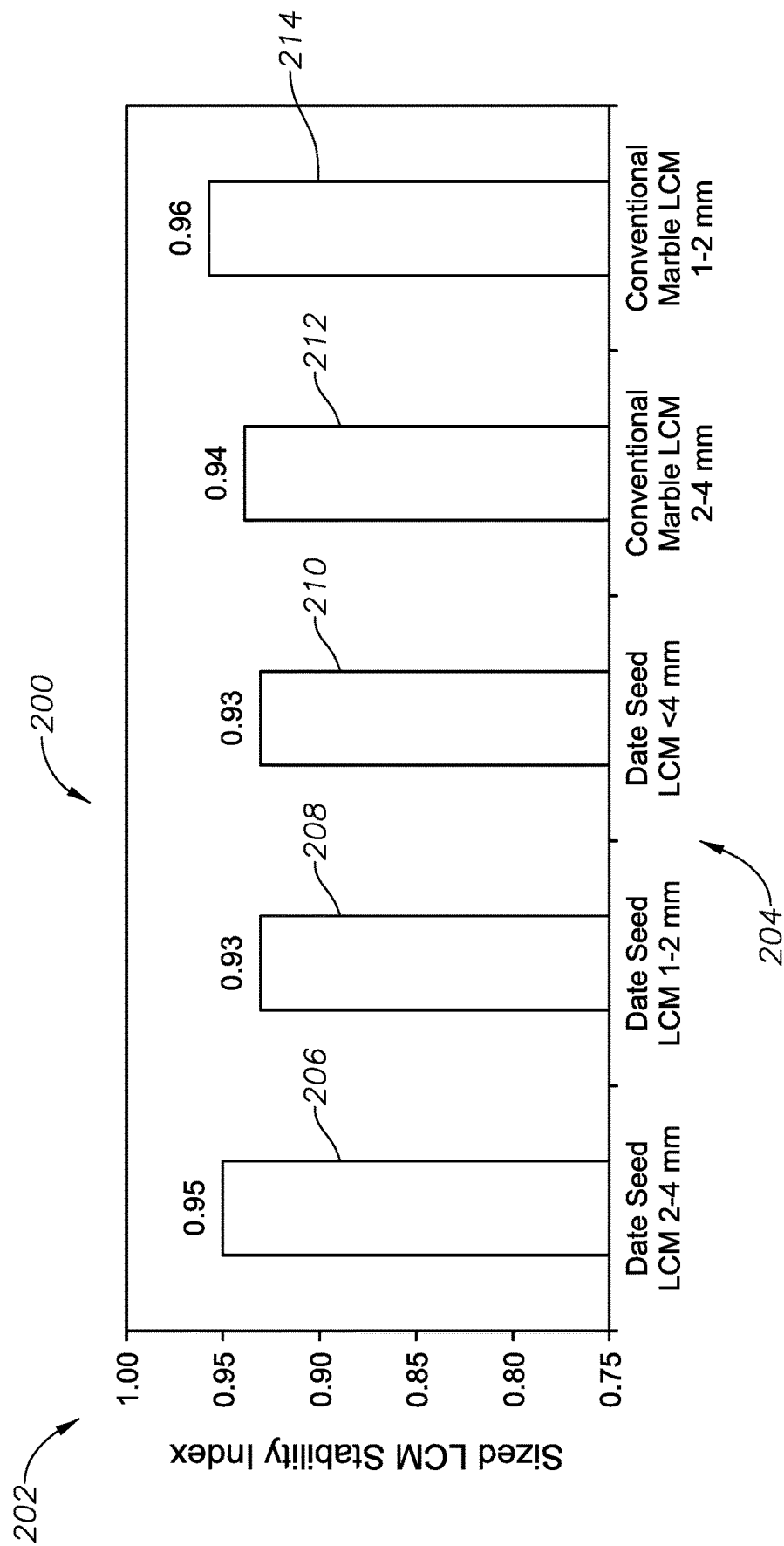
FIG. 2 is a bar graph of stability indices for various sizes of date palm seed LCMs as compared to conventional marble LCMs in accordance with an embodiment of the disclosure.

FIG. 2 depicts a stability index bar graph 200 that illustrates stability indices for various sizes of date palm seed LCMs as compared to conventional marble LCMs in accordance with an embodiment of the disclosure. As shown in FIG. 2, the Y-axis 202 corresponds to a stability index and the X-axis 204 corresponds different date palm seed LCMs and conventional marble LCMs.

As shown in FIG. 2, a date palm seed LCM having a particle size range of 2-4 mm (bar 206) may have a stability index of 0.95. As also shown in FIG. 2, a date palm seed LCM having a particle size range of 1-2 mm (bar 208) and a date palm seed LCM having a particle size range of less than 4 mm (bar 210) may each have a stability index of about 0.93. FIG. 2 also depicts a marble LCM having a particle size range of 2-4 mm (bar 212) and a stability index of about 0.94 and a marble LCM having a particle size range of 1-2 mm (bar 214) and a stability index of 0.96. Thus, as shown in the bar graph 200, the various date palm seed LCMs have sufficient toughness and strength to avoid degradation of the LCM particles in downhole conditions of a well.

Figure 3:
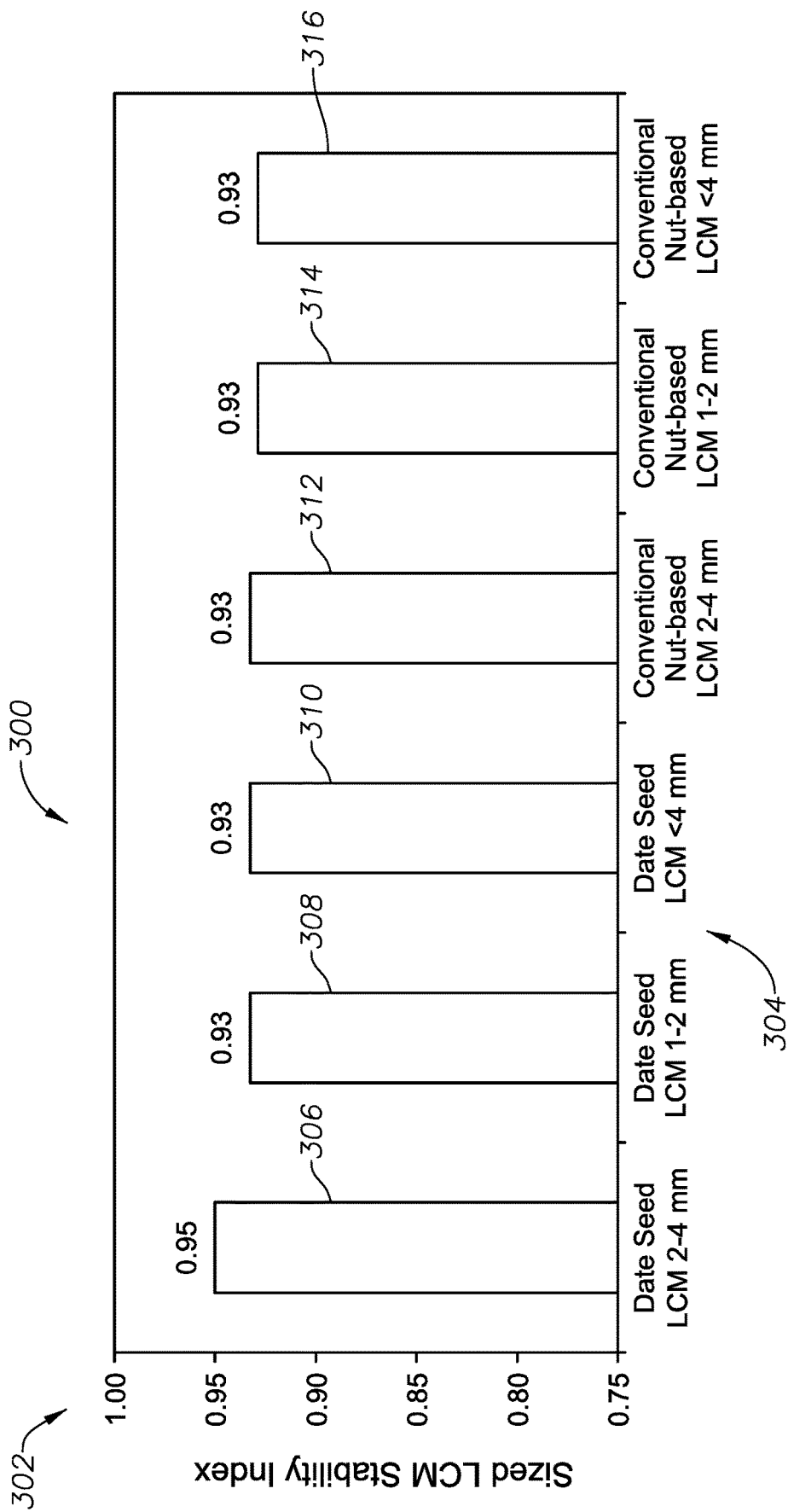
FIG. 3 is a bar graph of stability indices for various sizes of date palm seed LCMs as compared to conventional cellulose LCMs in accordance with an embodiment of the disclosure.

FIG. 3 depicts a stability index bar graph 300 that illustrates stability indices for various sizes of date palm seed LCMs as compared to conventional cellulose LCMs in accordance with an embodiment of the disclosure. As shown in FIG. 3, the Y-axis 302 corresponds to a stability index and the X-axis 304 corresponds to different date palm seed LCMs and conventional marble LCMs. FIG. 3 depicts a stability index of 0.95 for a date palm seed LCM having a particle size range of 2-4 mm (bar 306) and a stability index of 0.93 for both a date palm seed LCM having a particle size range of 1-2 mm (bar 308) and a date palm seed LCM having a particle size range of less than 4 mm (bar 310). FIG. 3 also depicts a conventional tree nut-based LCM having a particle size range of 2-4 mm (bar 312) and a stability index of about 0.93, a conventional nut-based LCM having a particle size range of 1-2 mm (bar 314) and a stability index of 0.93, and a conventional nut-based LCM having a particle size range of less than 4 mm (bar 316) and a stability index of 0.93. Here again, as shown by the stability index illustrated in FIG. 3, the date palm seed LCM may have sufficient toughness or strength to control loss of circulation while drilling.

Figure 4:
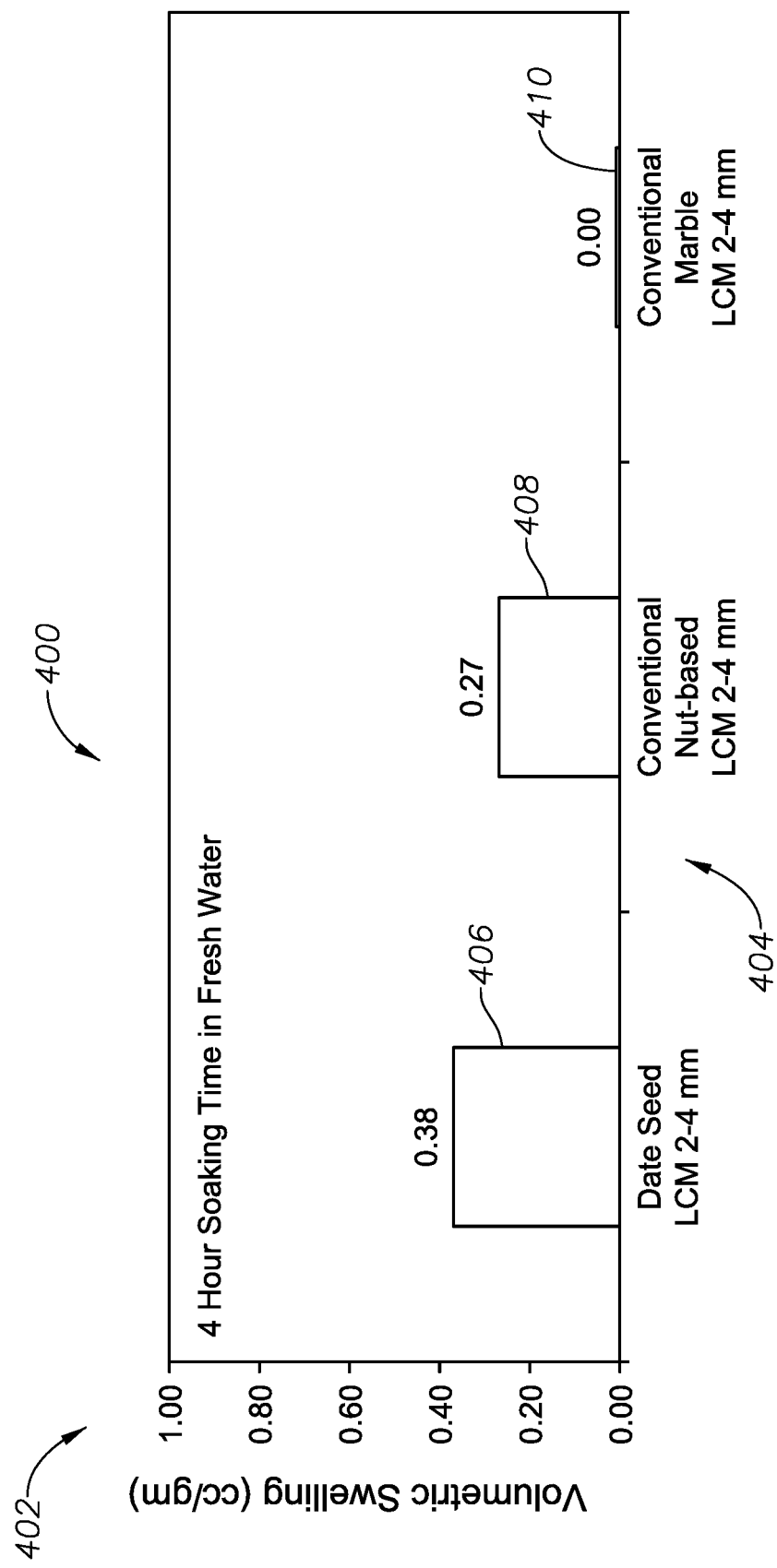
FIG. 4 is a bar graph of volumetric swelling for a date palm seed LCM as compared to conventional nut-based and marble LCMs in accordance with an embodiment of the disclosure.

FIG. 4 depicts a volumetric swelling bar graph 400 that illustrates volumetric swellings in fresh water over a four hour soaking time for a date palm seed LCM as compared to conventional nut-based and marble LCMs in accordance with an embodiment of the disclosure. As shown in FIG. 4, the bar graph 400 includes a Y-axis 402 that corresponds to a volumetric swelling (in cubic centimeters (cc) per gram (gm)) and an X-axis 404 that corresponds to the date palm seed LCM and the convention al LCM.

As shown in FIG. 4, a date palm seed LCM according to the techniques described in the disclosure and having a particle size range of 2-4 mm (bar 406) has a volumetric swelling of about 0.38. In contrast, as shown in FIG. 4, a conventional nut-based LCM having a particle size range of 2-4 mm (bar 408) has a volumetric swelling of about 0.27. As also shown in FIG. 4, a conventional marble LCM having a particle size range of 2-4 mm (bar 410) has a volumetric swelling of 0 and has no swelling capacity. Thus, the greater volumetric swelling of the date palm seed LCM indicates relatively high sealing and blocking efficiency when used in a lost circulation zone, thus showing the applicability of the date palm seed LCM as a loss control and formation strengthening additive. For example, Table 2 depicts volumetric swelling data for a date palm seed LCM, a tree nut-based LCM, and a marble LCM:

TABLE 2

Volumetric Swelling Data

| Sized LCM Sample | Dry Initial Weight (gm) | Weight after Water Absorption (gm) | Volumetric Swelling Capacity cc/gm |
|---|---|---|---|
| Date palm seed LCM 2-4 mm | 20.00 | 27.60 | 0.38 |
| Tree nut-based LCM 2-4 mm | 20.00 | 25.43 | 0.27 |
| Marble LCM 2-4 mm | 20.00 | 20.09 | 0.00 |

Figure 5:
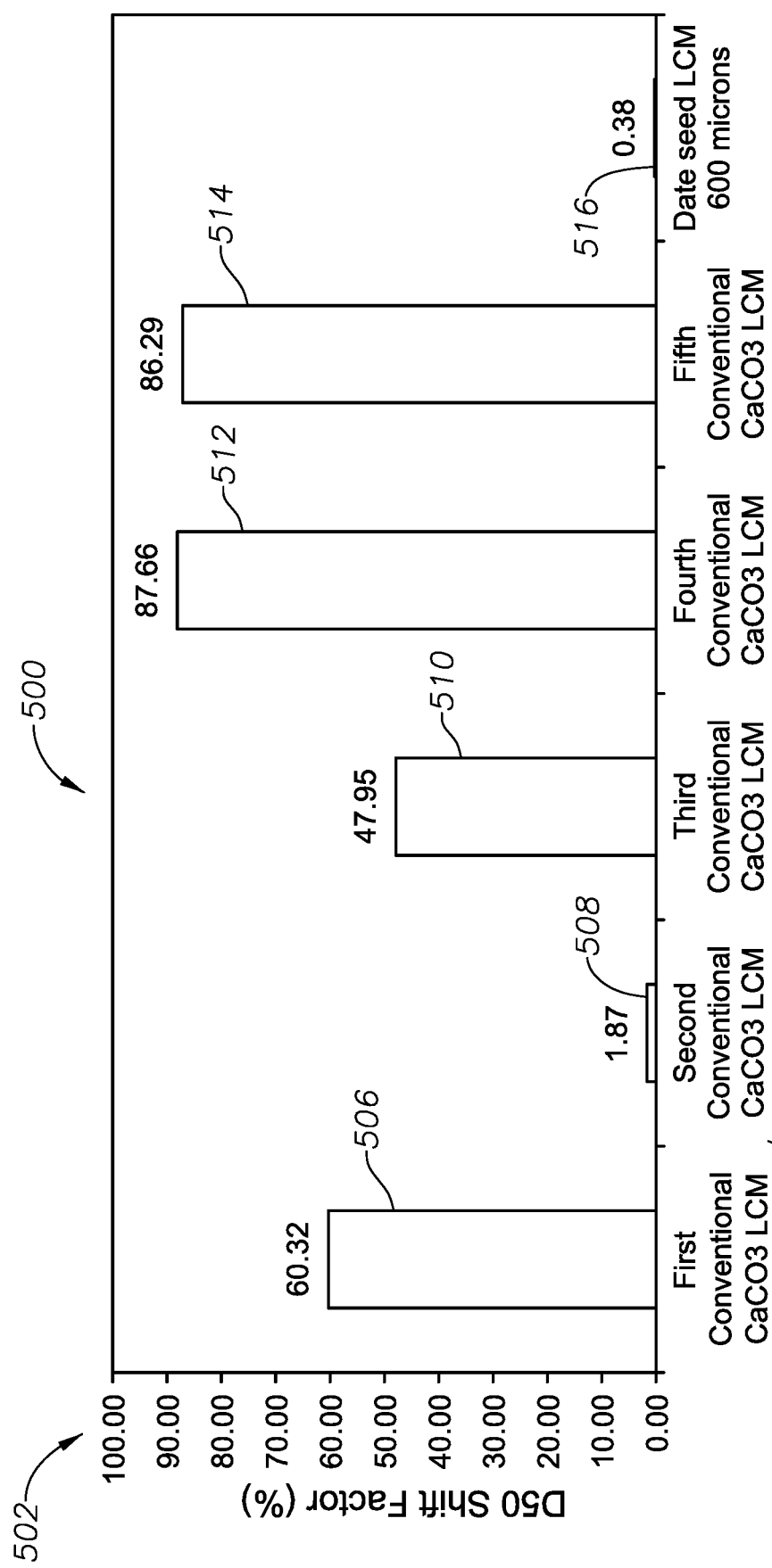
FIG. 5 is a bar graph of D50 shift factors for a date palm seed LCM as compared to various conventional calcium carbonate LCMs.

FIG. 5 depicts a D50 shift factor bar graph 500 that illustrates D50 shift factors for a date palm seed LCM as compared to various conventional calcium carbonate LCMs in accordance with an embodiment of the disclosure. As shown in FIG. 5, the bar graph 500 includes a Y-axis 502 that corresponds to a D50 shift factor (%) and an X-axis 504 that corresponds to the date palm seed LCM and the convention al LCM.

FIG. 5 depicts a D50 shift factor of 60.32 for a first conventional calcium carbonate LCM (bar 506), a D50 shift factor of 1.87 for a second conventional calcium carbonate LCM (bar 508), a D50 shift factor of 47.95 for a third conventional calcium carbonate LCM (bar 510), a D50 shift factor of 87.66 for a fourth conventional calcium carbonate LCM (bar 512), and a D50 shift factor of 86.29 for a fifth conventional calcium carbonate LCM (bar 514). As shown in FIG. 5, a date palm seed LCM according to the techniques described in the disclosure and having a particle size of about 600 microns (bar 516) has a D50 shift factor of about 0.38. A lesser D50 shift factor may indicate a high material toughness and lower degradation potential.

Figure 6:
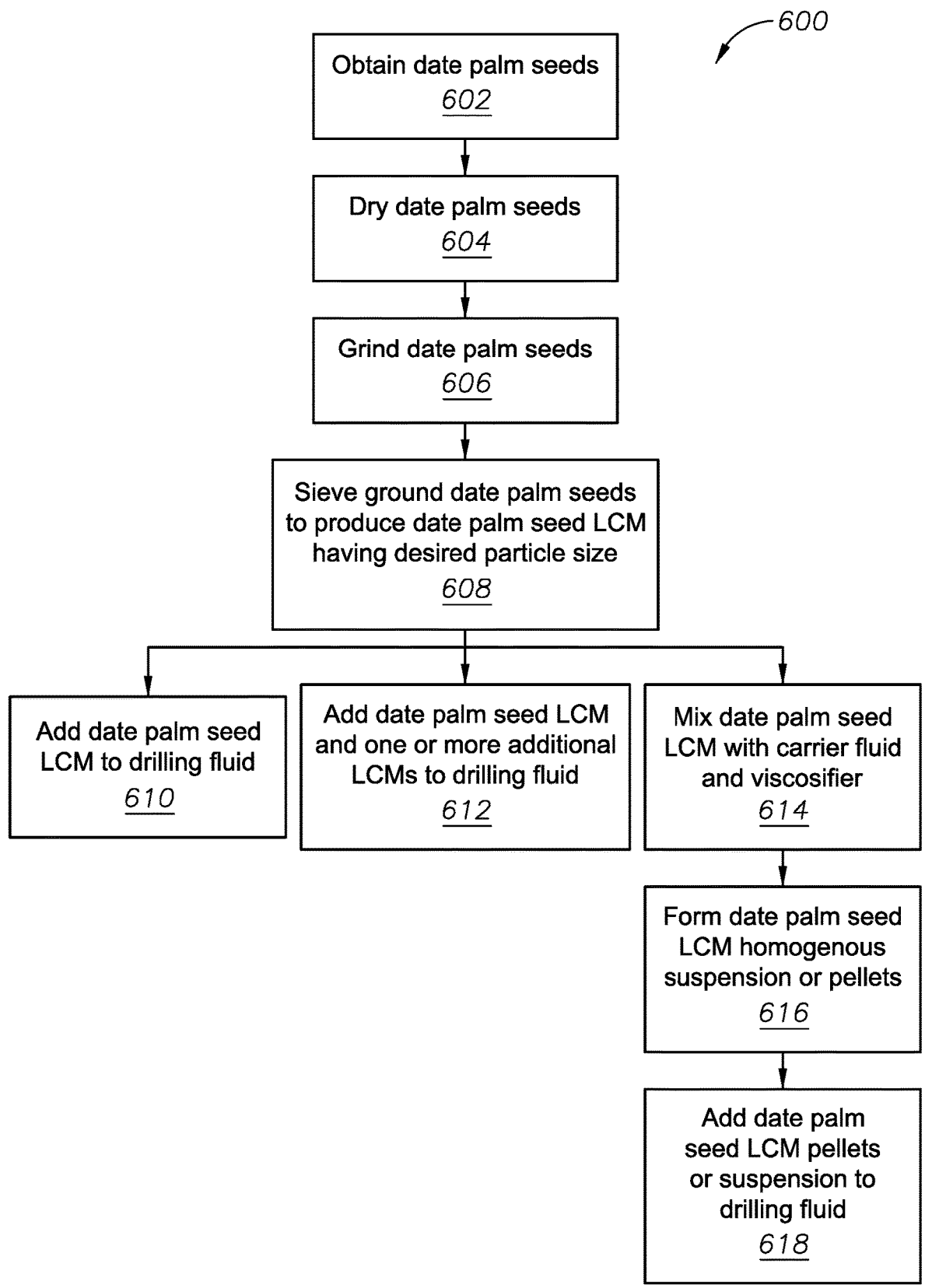
FIG. 6 is a block diagram of a process for a date palm seed LCM as compared to various conventional calcium carbonate LCMs.

FIG. 6 depicts a process 600 for manufacturing and using a date palm seed LCM in accordance with embodiments of the disclosure. As will be appreciated and as described infra, in some embodiments the date palm seed LCM may be produced without any additives or treatments, thus preserving the environmentally-friendly and biodegradable properties of both the manufacturing process and the date palm seed LCM. Moreover, no hazardous dust may be produced during the manufacture of the date palm seed LCM described infra. As noted supra, the untreated date palm seed LCM is produced without treatment with alkali or acid, without bleaching, without chemical alterations, without oxidation, and without extraction or reaction processes other than the drying of water. In other embodiments, the date palm seed LCM may be mixed or otherwise combined with additives or otherwise treated. In some embodiments, additives may be mixed or otherwise combined with the LCM to change the rheology or pH of the LCM. In some embodiments, such additives may include softening agents, surface active agents (surfactants), viscosity agents, thinning agents, dispersants, coatings (for example, pellet coatings), pH modifiers, insecticides, biocides, or any suitable combination thereof.

Initially, date palm seeds may be obtained (block 602). For example, the date palm seeds may be produced as a waste by-product from date processing, and the date palm seeds may be obtained from date processing plants to provide sustainable source of date palm seeds. Moreover, local sources of date palm seed may reduce the cost of imported LCM products. In some embodiments, the date palm seeds may be obtained from the species *Phoenix dactylifera*. It should be appreciated that, in some embodiments, the date palm seeds may be obtained from genetically modified date palms (that is, genetically modified organisms (GMOs)).

The obtained date palm seeds may be dried (block 604). In some embodiments, the date palm seeds may be dried using a sun drying process over a time period in atmospheric conditions. Next, the dried date palm seeds may be ground (block 606) using, for example a suitable grinder, such as an industrial grinder. In some embodiments, a suitable grinder may produce particle sizes from about 4 mm to less than 1 mm having a sub-angular roundness. In some embodiments, the date palm seeds may be crushed before being ground. For example, in such embodiments, the date palm seeds may be crushed to first size, and the crushed date palm seeds may be ground to a second size smaller than the first size.

The ground date palm seeds may be sifted to produce a date palm seed LCM having a desired particle size (block 608). For example, the ground date palm seeds may be sifted using sieves having a sieve opening size that produces the desired particle size. In some embodiments, the particles of the date palm seed may be less than about 5 mm, less than about 4 mm, less than about 3 mm, less than about 2 mm, less than about 1 mm, less than about 0.5 mm, less than about 0.25 mm, and less than about 0.15 mm. In some embodiments, the date palm seed LCM particulate may be greater than about 2 mm and less than about 4 mm. In some embodiments, the date palm seed LCM particulate may be greater than about 1 mm and less than about 2 mm. In some embodiments, the date palm seed LCM particulate may be about 600 microns. In some embodiments, a date palm seed LCM may have a particulate size (for example, from about 1 mm to about 4 mm) selected to mitigate or prevent release of tannins and avoid thinning of a drilling fluid or carrier fluid. As mentioned supra, in some embodiments the date palm seed particles are manufactured without treating, such that untreated date palm seed particles are produced. In such embodiments, the date palm seed particles may be manufactured without treating before, during, or after crushing, grinding, drying, or any other processing.

In some embodiments, the date palm seed LCM may be added directly to a drilling fluid (block 610), such as a drilling mud, to create an altered drilling fluid having the LCM. For example, in some embodiments, the date palm seed LCM may be added to (for example, blended with) an oil-based drilling mud or a water-based drilling mud. In some embodiments, the date palm seed LCM may be added at the mud pit of a mud system. After addition of the date palm seed LCM to a drilling fluid, the altered drilling fluid may be circulated at a pump rate effective to position the drilling fluid into contact with a lost circulation zone in a wellbore, such that the date palm seed LCM alters the lost circulation zone (for example, by entering and blocking porous and permeable paths, cracks, and fractures in a formation in the lost circulation zone). In some embodiments, the reduced rate of lost circulation may be about 80%. In some embodiments, the reduced rate of lost circulation may be negligible.

In some embodiments, the date palm seed LCM and one or more additional LCMs may be added to a drilling fluid (block 612), such as a drilling mud, to create an altered drilling fluid having the LCMs. For example, in some embodiments, the date palm seed LCM and one or more additional LCMs may be added to an oil-based drilling mud or a water-based drilling mud. In some embodiments, a date palm seed LCM may be manufactured to block fractures of less than 1 mm. In some embodiments, a date palm seed LCM may be manufactured to block fractures of about 4 mm.

As noted in the disclosure, the mechanical properties of the date palm seed LCM may prevent degradation of the date palm seed LCM while circulating downhole as a fluid loss additive or formation strengthening material. Moreover, the biodegradation properties of the date palm seed LCM may enable the date palm seed LCM to easily degrade and disappear from the environment over time and minimize or prevent any environmental impact. Further, the non-toxic properties of the date palm seed LCM may minimize or prevent any effect on ecosystems, habitats, population, crops, and plants surrounding the drilling site where the date palm seed LCM is used.

In some embodiments, the date palm seed LCM may be further processed. In some embodiments, the date palm seed may be mixed with a carrier fluid and a viscosifier (block 614). In some embodiments, date palm seed LCM pellets or a date palm seed LCM homogenous suspension may be formed (block 616). For example, a specific carrier fluid, viscosifier, or combination therefor may be selected to form a homogenous suspension having the date palm seed LCM. Similarly, a specific carrier fluid, viscosifier, or combination thereof may be selected to form pellets having the date palm seed LCM. In some embodiments, the carrier fluid may be water or an oil-based fluid. In some embodiments, the carrier fluid may be fresh water, sea water, salt water, diesel oil, mineral oil, or synthetic oil. In some embodiments, the viscosifier may be a clay or a polymer. In some embodiments, the viscosifier may be bentonite clay, XC polymer, starch, or psyllium husk. Next, the date palm seed LCM pellets or the homogenous suspension may be added to a drilling fluid (block 618), such as a drilling mud for example.

Further modifications and alternative embodiments of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described are to be taken as examples of embodiments. Elements and materials may be substituted for those illustrated and described in in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A method of forming an altered drilling fluid, comprising:
   drying a plurality of date palm seeds;
   grinding the plurality of date palm seeds to produce a plurality of untreated particles consisting essentially of ground date palm seeds;
   blending the plurality of untreated particles and a viscosifier into a lost circulation material (LCM) composition; and
   blending the LCM composition into a drilling fluid to create an altered drilling fluid.

2. The method of claim 1, wherein the drilling fluid is water-based drilling fluid.

3. The method of claim 1, wherein the plurality of untreated particles are not introduced to an alkali, an acid, a bleaching or an oxidation agent before blending into the LCM composition.

4. The method of claim 1, wherein the drying occurs using the sun over a time period in atmospheric conditions.

5. The method of claim 1, wherein the plurality of untreated parties and the viscosifier are blended into a LCM composition comprising a carrier.

6. The method of claim 1, wherein the LCM composition is a homogenous suspension.

7. The method of claim 1, wherein the LCM composition is a plurality of solid pellets.

8. The method of claim 1, wherein the plurality of untreated particles have a particle size selected to block fractures having a size of 4 millimeters in the lost circulation zone.

9. An altered drilling fluid, comprising:
   a drilling fluid; and
   a lost circulation material (LCM), wherein the LCM comprises a viscosifier and a plurality of untreated particles consisting essentially of ground date palm seeds.

10. The altered drilling fluid of claim 9, wherein the LCM comprises a carrier fluid.

11. The altered drilling fluid of claim 10, wherein the plurality of untreated particles, the carrier fluid, and the viscosifier form a homogenous suspension.

12. The altered drilling fluid of claim 10, wherein the plurality of untreated particles, the carrier fluid, and the viscosifier form a plurality of pellets.

13. The altered drilling fluid of claim 9, wherein each of the plurality of untreated particles as a particle size in the range of 1 millimeters to 2 millimeters.

14. A lost circulation material (LCM) composition, the composition comprising:
   a plurality of untreated particles consisting essentially of ground date palm seeds;
   a carrier fluid; and
   a viscosifier.

15. The LCM composition of claim 14, wherein the plurality of untreated particles, the carrier fluid, and the viscosifier form a homogenous suspension.

16. The LCM composition of claim 14, wherein the plurality of untreated particles, the carrier fluid, and the viscosifier form a plurality of pellets.

17. The LCM composition of claim 14, wherein the LCM composition has a volumetric swelling in fresh water that is greater than a similar LCM formed from tree nuts.

18. The LCM composition of claim 14, wherein the LCM composition has a volumetric swelling in fresh water over four hours of at least 0.3 cubic centimeters per gram.

19. The LCM composition of claim 14, wherein each of the plurality of untreated particles has a particle size in the range of 1 millimeters to 2 millimeters.

20. A method of forming a lost control material (LCM) composition, comprising:
 grinding a plurality of date palm seeds to form a plurality of date palm seed particles without treating the plurality of date palm seed particles; and
 mixing the plurality of date palm seed particles with a carrier fluid and viscosifier to form the LCM composition, wherein the LCM composition consists essentially of the carrier fluid, the viscosifier, and the plurality of date palm seed particles.

21. The method of claim 20, wherein the LCM composition comprises a homogenous suspension.

22. The method of claim 20, wherein grinding the plurality of date palm seeds comprises grinding the plurality of date palm seeds without treating the plurality of date palm seed particles with an alkali or an acid, without bleaching and without oxidizing.

23. The method of claim 20, comprising sun-drying the plurality of date palm seeds over a time period in atmospheric conditions before the grinding.

* * * * *